(12) United States Patent
Yang (10) Patent No.: US 8,945,377 B2
(45) Date of Patent: Feb. 3, 2015

(54) INSTALLATION-FREE WATER PURIFYING DEVICE

(75) Inventor: Chung-Hsiang Yang, Taichung (TW)

(73) Assignee: Puricom Water Industrial Corporation, Taichung (TW)

( * ) Notice: Subject to any disclaimer, the term of this patent is extended or adjusted under 35 U.S.C. 154(b) by 389 days.

(21) Appl. No.: 13/429,722

(22) Filed: Mar. 26, 2012

(65) Prior Publication Data

US 2012/0261318 A1 Oct. 18, 2012

(30) Foreign Application Priority Data

Apr. 14, 2011 (TW) .............................. 100206504 A (51) Int. Cl.
| | | |
|---|---|---|
| *C02F 1/44* | (2006.01) | |
| *B01D 61/10* | (2006.01) | |
| *C02F 1/00* | (2006.01) | |
| *B01D 61/08* | (2006.01) | |
| *B01D 61/12* | (2006.01) | |

(52) U.S. Cl.
CPC .................. *C02F 1/003* (2013.01); *B01D 61/12* (2013.01); *C02F 2307/10* (2013.01); *C02F 2209/44* (2013.01); *B01D 61/08* (2013.01); *C02F 1/441* (2013.01); *C02F 2209/42* (2013.01); *C02F 2209/445* (2013.01)
USPC ........ 210/138; 210/195.1; 210/262; 210/258; 210/321.6; 222/189.11

(58) Field of Classification Search
None
See application file for complete search history.

(56) References Cited

U.S. PATENT DOCUMENTS

| | | | | |
|---|---|---|---|---|
| 5,851,388 | A | * | 12/1998 | Suh ............................ 210/257.2 |
| 5,928,503 | A | * | 7/1999 | Shang-Chun ................... 210/86 |
| 2005/0247609 | A1 | * | 11/2005 | Laing et al. ................... 210/109 |
| 2006/0151393 | A1 | * | 7/2006 | Badger .......................... 210/652 |
| 2011/0284436 | A1 | * | 11/2011 | Shin et al. ..................... 210/143 |
| 2011/0303589 | A1 | * | 12/2011 | Kuennen et al. ................ 210/95 |

* cited by examiner

*Primary Examiner* — Terry Cecil
(74) *Attorney, Agent, or Firm* — Rosenberg, Klein & Lee (57) ABSTRACT

An installation-free water purifying device comprises a raw/waste water common container and a filtering body. This raw/waste water common container is separated by a partition into an upper space and a lower space. The filtering body has a storing space, a purified water container, a filtering unit, and a flowing controller. Raw water is initially stored in the raw/waste water common container 10. Next, raw water in the upper space is pumped to the filtering unit for water filtering and then guided as purified water into the purified water container. Waste water generated from the filtering unit is guided into the vertical guiding portion so as to push the raw water in the lower space moving upward. In which, it does not require any complicated installing work. Waste water can be recycled. The user can start to use it quickly by an electric plug.

3 Claims, 10 Drawing Sheets

INSTALLATION-FREE WATER PURIFYING DEVICE

BACKGROUND OF THE INVENTION

1. Field of the Invention

The present invention relates to a water purifying device. Particularly, it relates to an installation-free water purifying device. In which, it does not require any complicated installation work. Waste water can be recycled. In addition, the user can start to use it quickly by an electric plug.

2. Description of the Prior Art

About the traditional reverse osmosis water purifying device (not shown), usually it requires a professional technician to install it. When it is installed in a kitchen, it needs to install a water supply pipe, a waste water pipe, a pure water pipe, and a power line. If it is secured on a wall, a hole drilling work must be done. In addition, a three-way connector has to be installed on the faucet as a branch for connecting with the supply water pipe. Furthermore, this waste water pipe has to be guided to a nearest drainage hole on the ground or beneath the kitchen's water sink. Therefore, in order to solve the water supplying and waste water draining problems, it is troublesome to do such installation work. Besides, once the installation is done, if the user wants to relocate it to other place in the future, it still requires a professional one to detach and re-install it again.

Therefore, it has the following problems and disadvantages. It requires a professional technician to install it. The waste water cannot be recycled. Plus, it cannot be relocated easily.

SUMMARY OF THE INVENTION

The object of the present invention is to provide an installation-free water purifying device. In which, it does not require any complicated installation work. Waste water can be recycled. And, the user can start to use it quickly by an electric plug.

Hence, this invention is able to solve the problems and disadvantages listed as follows. It requires a professional technician to install it. The waste water cannot be recycled. Plus, it cannot be relocated easily.

In order to solve the above-mentioned problems, the present invention is provided. An installation-free water purifying device comprises:

a raw/waste water common container having an inner wall surface, an storage space, a partition, a vertical guiding portion, an outlet portion and a securing portion; the partition including a through hole, an outer edge and at least one connecting portion; the storage space having a depth, the partition being positioned at an approximately one half depth of the storage space by the securing portion so as to separate the storage space into an upper space and a lower space; the connecting portion being provided for connecting the upper space and the lower space; the vertical guiding portion being positioned by the through hole and the vertical guiding portion having a top opening, a vertical channel and a bottom opening, the top opening being positioned in the upper space and the bottom opening being position in the lower space; the outlet portion being positioned in the upper space;

a filtering body having a storing space, a purified water container, a filtering unit, and a flowing controller; the raw/waste water common container being disposed in the storing space; the filtering unit including a connecting pipe, a pump, a purifier, a purified water pipe and a waste water pipe; the connecting pipe being provided for connecting with the outlet portion; the pump being able to suck water from the raw/waste water common container to the purifier, the purifier being provided for filtering water pumped by the pump; the purified water pipe connecting with the purified water container, the waste water pipe being able to guide water to the top opening of the vertical guiding portion; the flowing controller having a time regulator, a purified water outlet, and a purified water switch; the time regulator being provided for controlling an operating time of the filtering unit, the water stored in the purified water container being able to flow out from the purified water outlet and controlled by the purified water switch;

so that raw water is initially stored in the raw/waste water common container, raw water in the upper space is pumped to the filtering unit for water filtering and then purified water is guided into the purified water container, waste water generated from the filtering unit is guided into the vertical guiding portion through the waste water pipe; the waste water having a relatively higher concentration of waste particles; after the waste water is guided into the lower space through the vertical channel, the raw water which has a density smaller than the waste water's density is pushed and moved to the upper space by the waste water so as to allow raw water in the upper space to be guided into the purifier for the next filtering process.

LIST OF REFERENCE NUMBERS

| 10 | raw/waste water common container | 11 | inner wall surface |
|---|---|---|---|
| 12 | storage space | 121 | upper space |
| 122 | lower space | 13 | partition |
| 131 | through hole | 132 | outer edge |
| 133 | connecting portion | 14 | vertical guiding portion |

| | | | |
|---|---|---|---|
| 141 | top opening | 142 | vertical channel |
| 143 | bottom opening | 15 | outlet portion |
| 16 | securing portion | 20 | filtering body |
| 20A | detector | 21 | storing space |
| 22 | purified water container | 221 | overflow pipe |
| 23 | filtering unit | 231 | connecting pipe |
| 232 | purifier | 233 | purified water pipe |
| 234 | waste water pipe | 24 | flowing controller |
| 241 | time regulator | 242 | purified water outlet |
| 243 | purified water switch | 70 | raw water |
| 71 | purified water | 72 | waste water with higher concentration |
| 73 | waste water with lower concentration | H1 | first height |
| H2 | second height | H3 | third height |
| H4 | fourth height | H5 | fifth height |
| H11 | first purified water height | H12 | second purified water height |
| H13 | third purified water height | H14 | fourth purified water height |
| P | pump | | |

DETAILED DESCRIPTION OF THE PREFERRED EMBODIMENT

Figure 1:
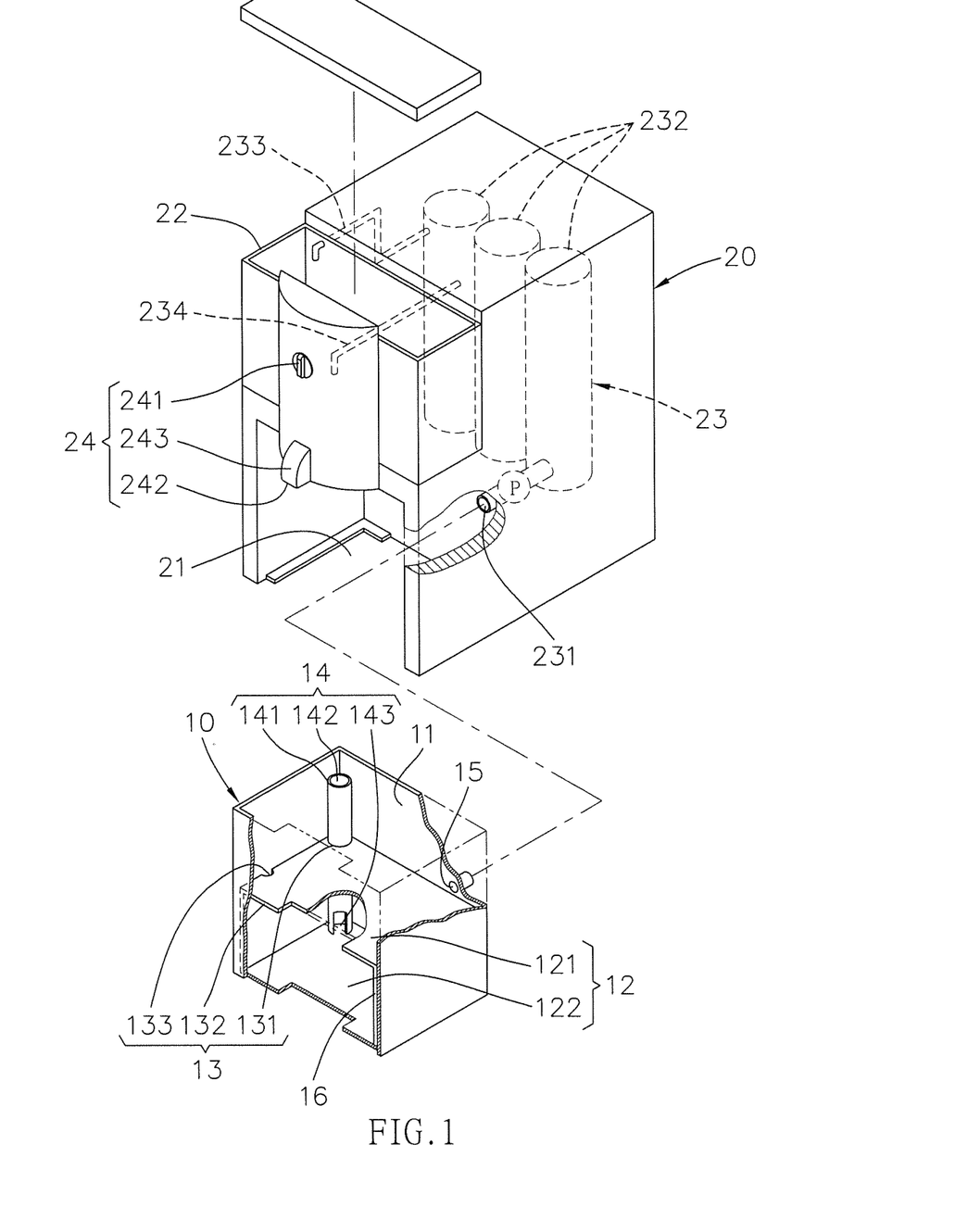
FIG. 1 is a perspective view showing this invention that is disassembled.
Figure 2:
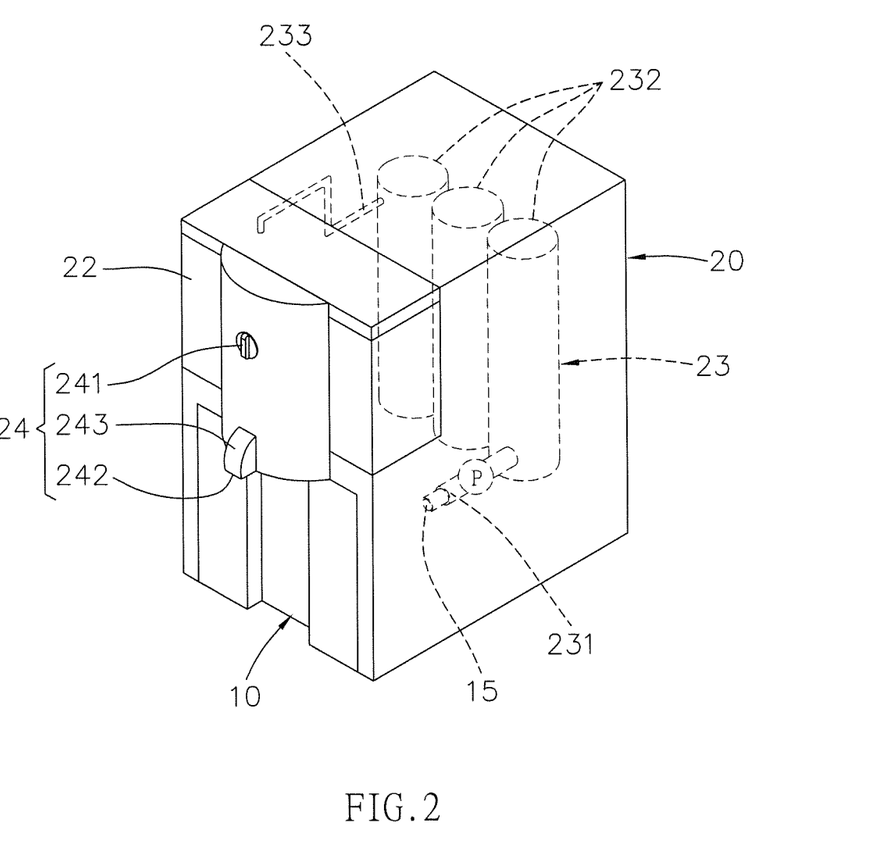
FIG. 2 is a perspective view of this invention.
Figure 3:
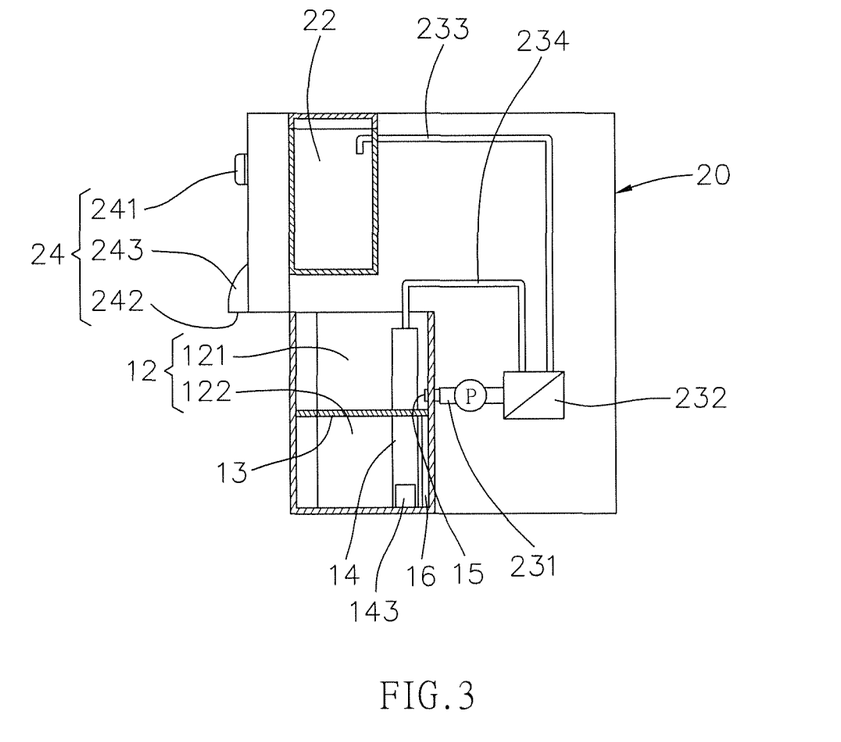
FIG. 3 is a schematic view showing the structure of this invention.

With reference to FIGS. 1, 2, and 3, the present invention is an installation-free water purifying device. It mainly comprises a raw/waste water common container 10 and a filtering body 20.

Regarding the raw/waste water common container 10, it has an inner wall surface 11, a storage space 12, a partition 13, a vertical guiding portion 14, an outlet portion 15, and a securing portion 16. The partition 13 includes a through hole 131, an outer edge 132 and at least one connecting portion 133. The storage space 12 has a depth. The partition 13 is positioned at an approximately one half depth of the storage space 12 by the securing portion 16 (such as four corners of the partition 13 are supported by the securing portion 16) so as to separate the storage space 12 into two parts, namely an upper space 121 and a lower space 122. Furthermore, the connecting portion 131 is provided for connecting the upper space 121 and the lower space 122. The vertical guiding portion 14 is positioned and fixed by the through hole 131 and the vertical guiding portion 14 has a top opening 141, a vertical channel 142, and a bottom opening 143. The top opening 141 is positioned in the upper space 121 and the bottom opening 122 is position in the lower space 122. The outlet portion 15 is positioned in the upper space 121.

Concerning the filtering body 20, it has a storing space 21, a purified water container 22, a filtering unit 23, and a flowing controller 24. The raw/waste water common container 10 is disposed in the storing space 21. The filtering unit 23 includes a connecting pipe 231, a pump P, a purifier 232 (such as a reverse osmosis water purifier), a purified water pipe 233, and a waste water pipe 234. Moreover, the connecting pipe 231 is provided for connecting with the outlet portion 15. The pump P is able to suck water from the raw/waste water common container 10 to the purifier 232 (to conduct the filtering process). The purifier 232 is provided for filtering water that is pumped by the pump P. The purified water pipe 233 connects with the purified water container 22 and the waste water pipe 234 is able to guide water to the top opening 141 of the vertical guiding portion 14. In addition, the flowing controller 24 has a time regulator 241, a purified water outlet 242, and a purified water switch 243. The time regulator 241 is provided for controlling an operating time of this filtering unit 23. The water stored in the purified water container 22 is able to flow out from the purified water outlet 242 and controlled by the purified water switch 243.

So, raw water is initially stored in the raw/waste water common container 10. Next, raw water in the upper space 121 is pumped to the filtering unit 23 for water filtering and then the purified water is guided into the purified water container 22. At the same time, waste water generated from the filtering unit 23 is guided into the vertical guiding portion 14 through the waste pipe 234. The waste water has a relatively higher concentration of waste particles. After the waste water is guided into the lower space 122 through the vertical channel 132, the raw water (which has a density smaller than the waste water's density) is pushed and moved to the upper space 121 by the waste water so as to allow raw water in the upper space 121 to be guided into said purifier 232 for next filtering process.

Therefore, when the waste water with higher concentration (of particles) continues to flow into the lower space 122, it tends to move down in the lower position because it is relatively heavier. As a result, the water with lower concentration (of particles) is pushed (or squeezed) upward to the upper space 121. Based on this principle, the outlet portion 15 is able to draw the water with lower concentration (of particles) out.

As shown in FIG. 3, the purifier 232 is illustrated by a simplified symbol.

Figure 4A:
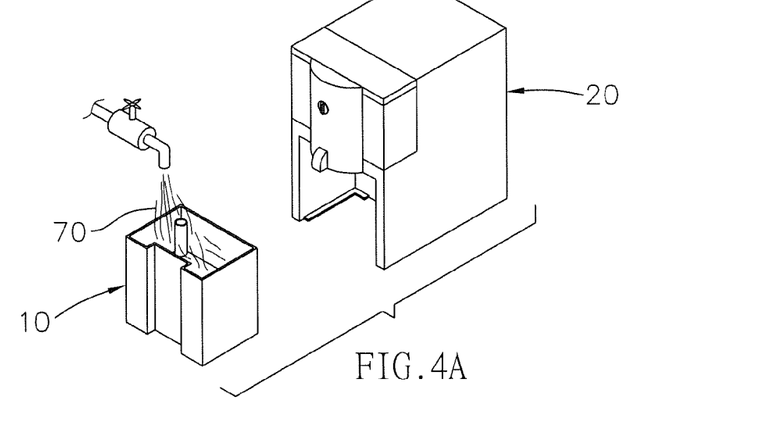
FIG. 4A is a view illustrating the set-up process one.
Figures 4B, 4C:
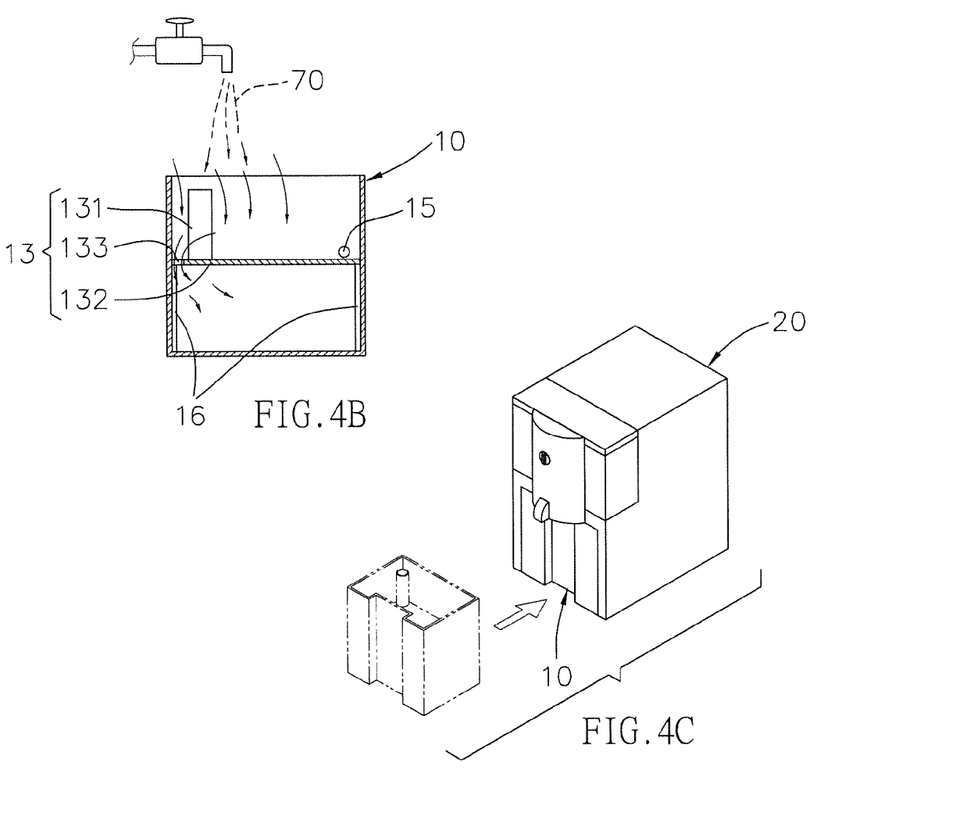
FIG. 4B is a cross-sectional view illustrating the set-up process one.
FIG. 4C is a view showing the set-up process two.

With regard to the detailed operation process, it can be described as follows. Referring to FIGS. 4A, 4B and 4C, the user takes the raw/waste water common container 10 to fill raw water 70 from a faucet. So, raw water 70 is filled in the both the uppers space 121 and the lower space 121. Then, the raw/waste water common container 10 is inserted into the storing space 21. Of course, the position of the outlet portion 15 is designed to match the connecting pipe 231. After the raw/waste water common container 10 is well inserted into the storing space 21, the outlet portion 15 can engage with the connecting pipe 231 exactly (as shown in FIG. 3).

Figure 5A:
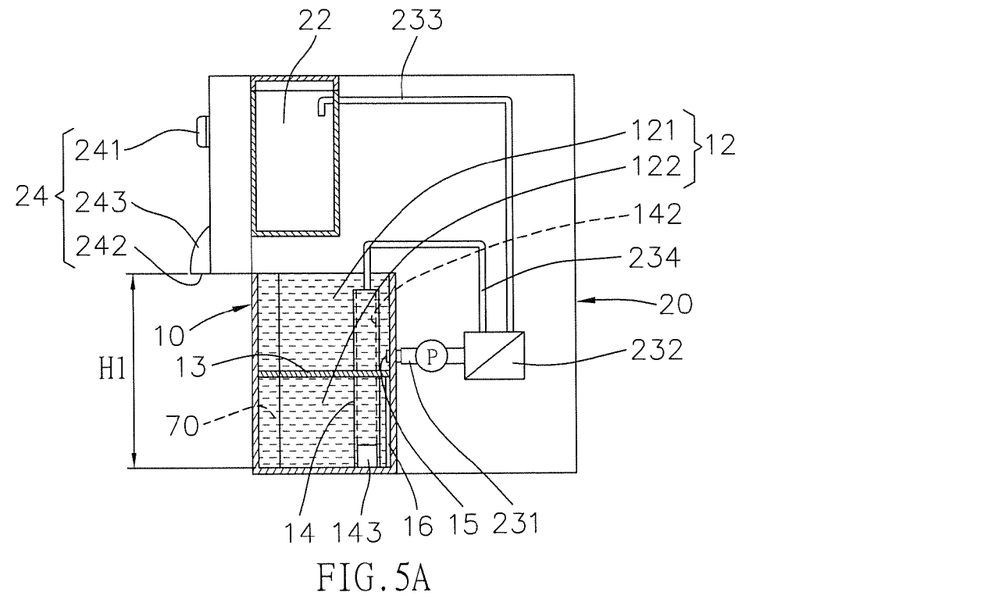
FIG. 5A illustrates the water filtering process one of this invention.
Figure 5B:
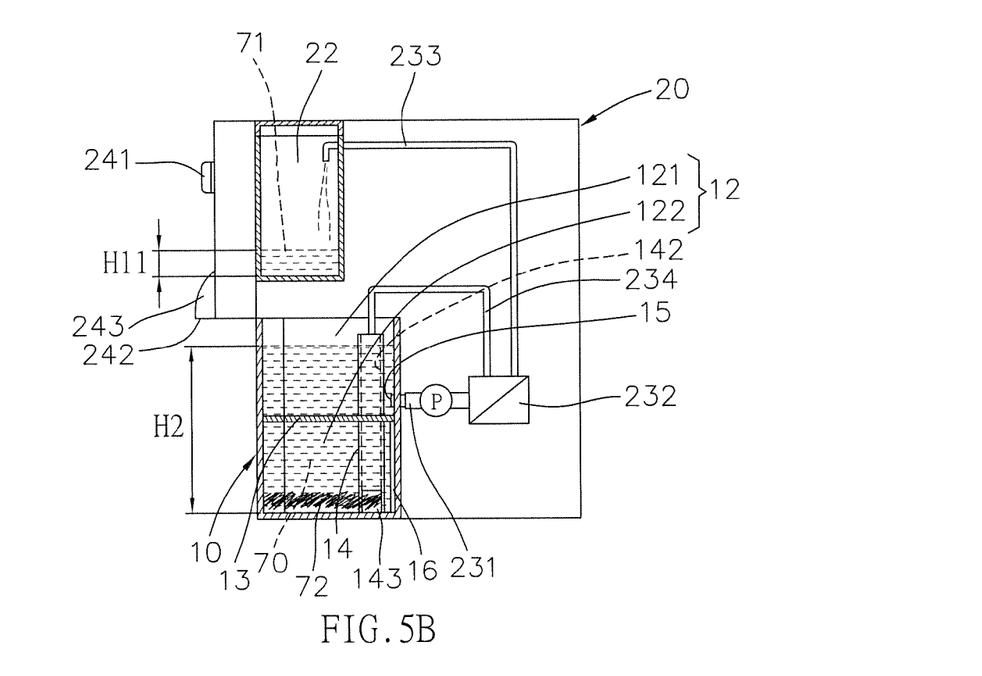
FIG. 5B illustrates the water filtering process two of this invention.

As illustrated in FIGS. 5A and 5B, by using the pump P, the raw water 70 in the upper space 121 is sucked into the connecting pipe 231 and then into the purifier 232 for water treatment. Moreover, about the water level of raw water 70, it is changed from a first height H1 to a second height H2. After the raw water 70 is filtered, a certain portion of purified water 71 and waste water with higher concentration 72 are generated. The purified water 71 flows to the purified water container 22 via the purified water pipe 233 and has a first purified water height H11. Meanwhile, the waste water with higher concentration 72 flows into the waste water pipe 234 and then guided into the vertical channel 142 of the vertical guiding portion 14.

Figure 5C:
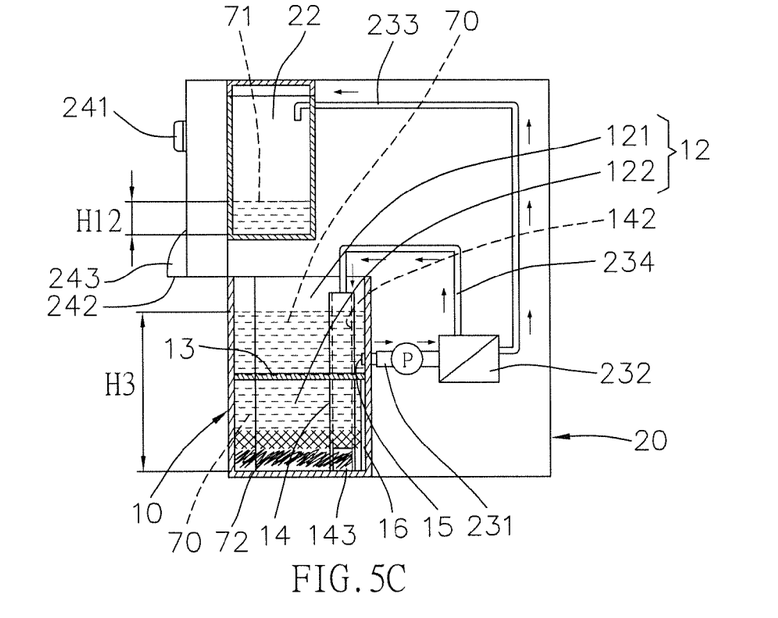
FIG. 5C illustrates the water filtering process three of this invention.

As depicted in FIG. 5C, as raw water 70 continues to be sucked into the purifier 232, the water level is changed from the second height H2 to a third height H3. At the same time, the water level of the purifier water 71 in the purifier water container 22 is changed from the first purified water height H11 to a second purified water height H12. The waste water with higher concentration 72 is guided to the vertical channel 142 of the vertical guiding portion 14 and then flows out via the bottom opening 143. Because the averaged density of the waste water with higher concentration 72 is larger, the relatively lighter raw water 70 will be pushed (or squeezed) upward to the upper space 121.

Figure 5D:
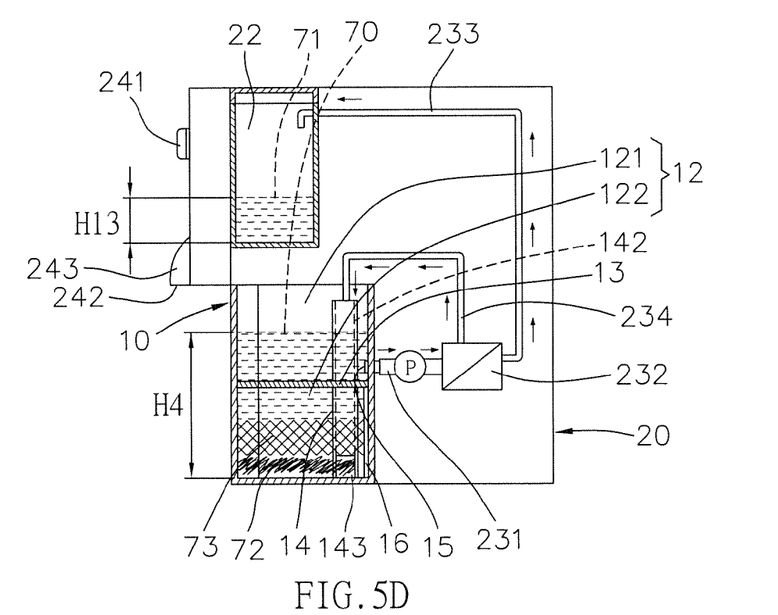
FIG. 5D illustrates the water filtering process four of this invention.

With reference to FIG. 5D, raw water 70 is pumped into the purifier 232 constantly. The water level is lowered from the third height H3 to a fourth height H4. At this moment, the water level of the purifier water 71 in the purifier water container 22 is changed from the second purified water height H12 to a third purified water height H13.

During this process, the waste water with higher concentration 72 is guided into the lower space 121. Hence, the relatively lighter raw water 70 is pushed (or squeezed) upward to the upper space 121 unceasingly. Of course, about the particles (or impurities) in the waste water stored in the lower space 122, they will be precipitated and move down so that it turns into a waste water with relative lower concentration 73.

Also, such waste water with relative lower concentration 73 will be pushed (to move upward) by the waste water with higher concentration 72. In addition, after the waste water with higher concentration 72 flows in the lower space 122, except the pushing (or squeezing) effect, mixing as well as diffusing phenomena might be generated (between the waste water with higher concentration 72 and the raw water 70).

Figure 5E:
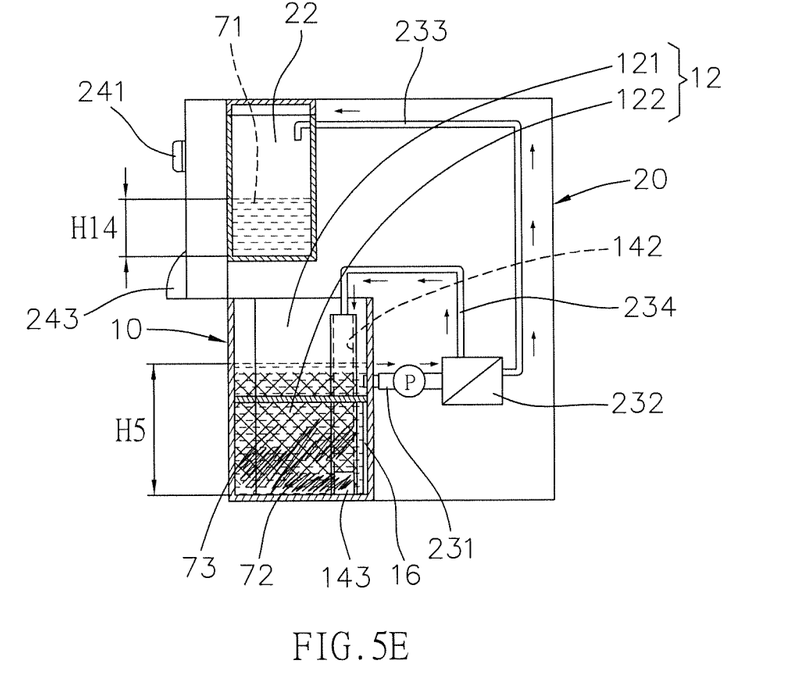
FIG. 5E illustrates the water filtering process five of this invention.

As shown in FIG. 5E, the water level is further lowered from the fourth height H4 to a fifth height H5 (the water level of the purified water 71 in the purified water container 22 is changed from the third purified water height H13 to a fourth purified water height H14 accordingly). The waste water with higher concentration 72 is guided into the lower space constantly. The raw water 70 and the waste water with relative lower concentration 73 are pushed upward. So, the water outlet 15 would draw out the water with relatively lower concentration (of particles or impurities). In order to illustrate the condition of concentration, it is represented by the sparse lines (for lower concentration) or dense lines (for higher concentration) in the drawing. That is, with regard to the incoming water for the purifier 232, if the concentration of particles is lower, it is better for the product life of the filtering membrane (such as reverse osmosis membrane). However, the water is drawn from the upper space 121 first and then is filtered by the purifier 232. The waste water with higher concentration 72 is guided into the vertical channel via the waste water pipe 234. Finally, it will force the water with lower concentration moving upward to continue another cycle (and repeated).

Of course, the operation time for the pump P to pump up the raw water 70 into the purifier 232 can be controlled by the time regulator 241. For example, if the time regulator 241 is set by three minutes, the pump P will work for three minutes to draw the raw water 70 into the purifier 232 for filtering water. When the time is up, the pump P will stop (so the purifier 232 will not work). The time can be adjusted depending upon the volume of purified water needed. However, if the volume of purified water is not enough during the pre-set time, the user can adjust it to increase the volume.

About the purifier 232, it is a reverse osmosis device that includes a reverse osmosis membrane (not shown in Figures). After the reverse osmosis membrane is used for a period of time, particles (or impurities) are apt to be stuck on the outer surface or tiny holes of the reverse osmosis membrane. Once some of the tiny holes are stuck, the processing speed and filtering capacity will be reduced significantly. Hence, the purified water generating rate becomes slower. By utilizing the time regulator 241, the operation time can be increased (or adjusted) to obtain the desired volume of purified water if the user finds the processing speed or volume is not satisfactory.

Figure 6:
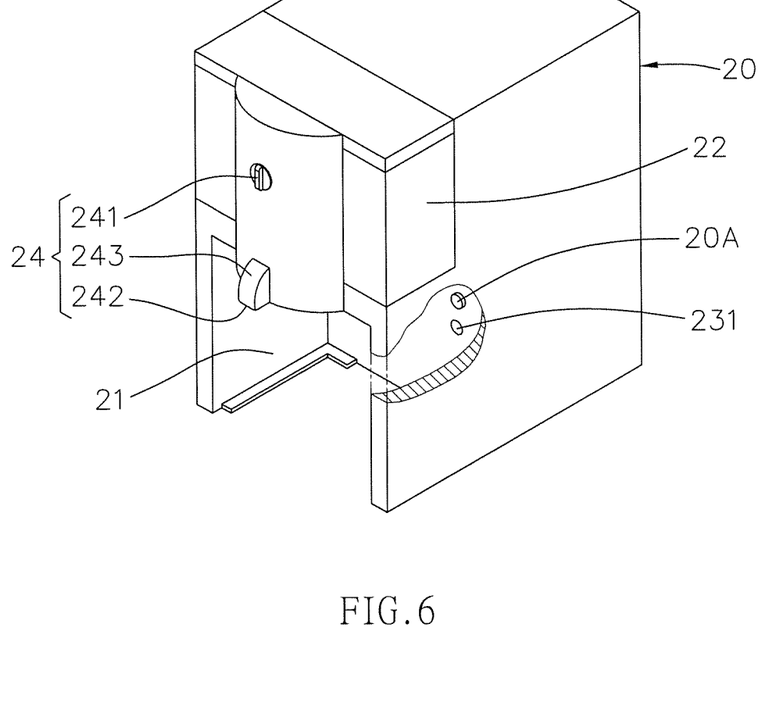
FIG. 6 is a perspective view of the second preferred embodiment of this invention.

As illustrated in FIG. 6, a detector 20A can be disposed in the storing space 21 for detecting a set-up condition of the raw/waste water common container 10. If the raw/waste water common container 10 is inserted at the correct position, this filtering unit 23 can be turned on; otherwise, it cannot be turned on. That is, the raw/waste water common container 10 must be completely inserted at the correct position (so the outlet portion 15 engages with the connecting pipe 231 exactly). Then, the detector 20A will be activated so as to turn on the filtering unit 23 automatically.

Figure 7:
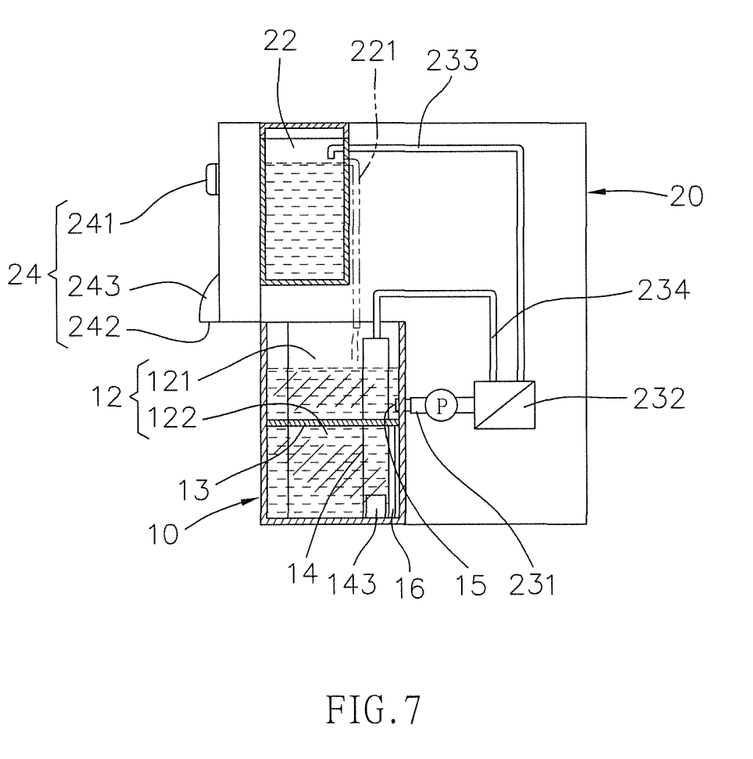
FIG. 7 is a perspective view of the third preferred embodiment of this invention.

Referring to FIG. 7, an overflow pipe 221 is disposed near a top of the purified water container 22. The overflow pipe 221 communicates between the purified water container 22 and the storage space 12. When the water level exceeds an entrance of the overflow pipe 221, water will flows down to the storage space 12 via this overflow pipe 221. Therefore, when the setting time of the time regulator 241 is too long (generating too much purified water), the excess purified water will be guided out. So, the volume of the purified water in the purified water container 22 can maintain at certain level to avoid overflow problem.

Besides, this invention is not required to installing connecting pipes. The user only needs to insert the electric plug into a socket. Thus, it is suitable to be used in many places such as a store, a living room, an office, or even an outdoor environment (the electricity can be supplied by an automobile).

Figure 8:
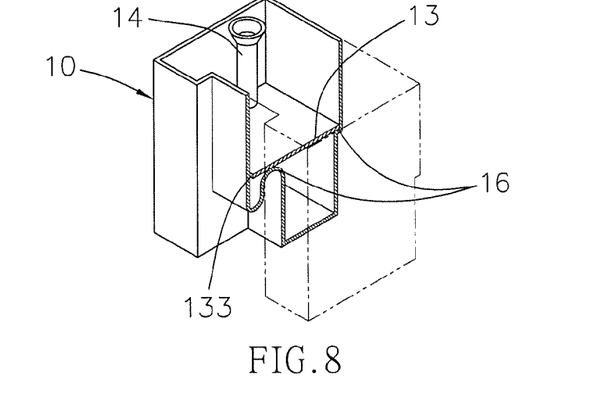
FIG. 8 is a perspective view of the fourth preferred embodiment of this invention.
Figure 9:
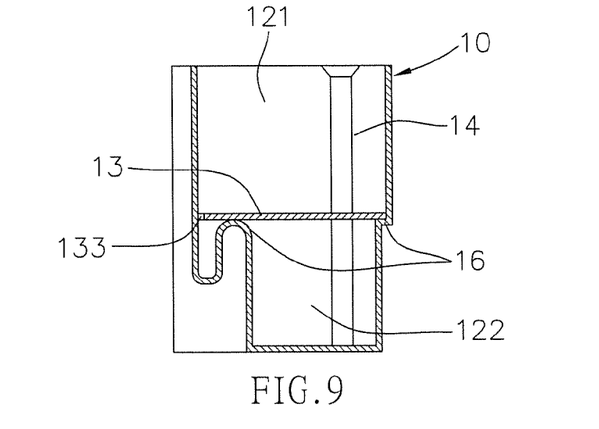
FIG. 9 is a cross-sectional view of the fourth preferred embodiment of this invention.
Figure 10:
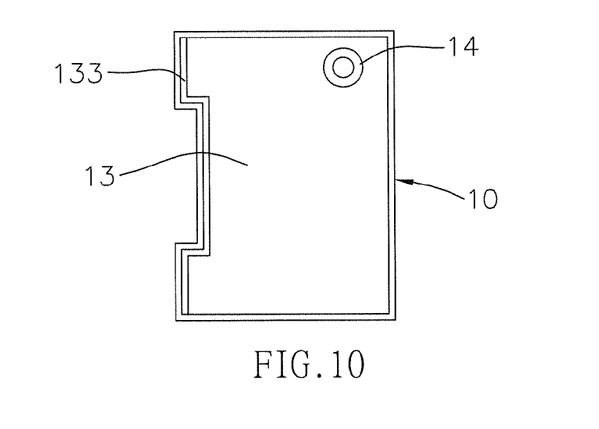
FIG. 10 is a top view of the fourth preferred embodiment of this invention.

Concerning the design of the securing portion 16, except supporting four corners of the partition 13, it can be effectuated by other way. As shown in FIGS. 8 and 9, the shape of raw/waste water common container 10 can be designed as the one shown in FIGS. 8 and 9. This securing portion 16 is directly formed on the raw/waste water common container 10 for supporting the partition 13. In addition, regarding to the design of connecting portion 13, it is a structure of hole shown in FIG. 1. Except that design, the connecting portion 13 could be modified as a narrow gap shown in FIGS. 8 to 10 instead. By selecting a proper shape and size of the partition 13, a narrow gap is formed between the inner wall surface 11 and the partition 13 for allowing water flowing through.

Therefore, the advantages and functions of this invention can be summarized as follows:

[1] This invention does not require any complicated installation work. The traditional reverse osmosis device requires a professional technician to install it. Such installation work is troublesome. However, this invention does not need to install or connect any pipelines. It is suitable to be used in many places in our daily life, such as store, living room, office, etc.

[2] Waste water can be recycled. For a typical reverse osmosis water purifier, the ratio of the purified water and the waste water is 1:3. The waste water pipe of the tradition one is connected to a nearest drainage hole (on the ground or beneath the water sink). So, certain volume of water is wasted. In this invention, the waste water is guided into the vertical channel 142 and then be diluted for re-use. Thus, the recycled waste water can be re-treated again for effectuating the purpose of waste water recycling.

[3] The user can start to use it quickly by an electric plug. If the user wants to use this invention, the user only needs to fill the raw/waste water common container 10, insert it into the filtering body 20, and finally insert the electric plug into a socket to start use this invention. Thus, the user can start to use it quickly by an electric plug.

While this invention has been particularly shown and described with references to the preferred embodiments thereof, it will be understood by those skilled in the art that various changes or modifications can be made therein without departing from the scope of the invention by the appended claims.

I claim

1. An installation-free water purifying device comprises:
   a raw/waste water common container having an inner wall surface, a storage space, a partition, a vertical guiding portion, an outlet portion and a securing portion; said partition including a through hole, an outer edge and at least one connecting portion; said storage space having a depth, said partition being positioned at an approximately one half depth of said storage space by said securing portion so as to separate said storage space into an upper space and a lower space; said connecting portion being provided for connecting said upper space and said lower space; said vertical guiding portion being positioned by said through hole and said vertical guiding portion having a top opening, a vertical channel and a bottom opening, said top opening being positioned in said upper space and said bottom opening being position in said lower space; said outlet portion being positioned in said upper space;

a filtering body having a storing space, a purified water container, a filtering unit, and a flowing controller; said raw/waste water common container being disposed in said storing space; said filtering unit including a connecting pipe, a pump, a purifier, a purified water pipe and a waste water pipe; said connecting pipe being provided for connecting with said outlet portion; said pump being able to suck water from said raw/waste water common container to said purifier, said purifier being provided for filtering water pumped by said pump; said purified water pipe connecting with said purified water container, said waste water pipe being able to guide water to said top opening of said vertical guiding portion; said flowing controller having a time regulator, a purified water outlet, and a purified water switch; said time regulator being provided for controlling an operating time of said filtering unit, said water stored in said purified water container being able to flow out from said purified water outlet and controlled by said purified water switch;

so that raw water is initially stored in said raw/waste water common container, raw water in said upper space is pumped to said filtering unit for water filtering and then purified water is guided into said purified water container, waste water generated from said filtering unit is guided into said vertical guiding portion through said waste water pipe; said waste water having a relatively higher concentration of waste particles; after the waste water is guided into said lower space through said vertical channel, said raw water which has a density smaller than said waste water's density is pushed and moved to said upper space by said waste water so as to allow raw water in said upper space to be guided into said purifier for the next filtering process.

2. The installation-free water purifying device as claimed in claim 1, further comprising a detector disposed in said storing space for detecting a set-up condition of said raw/waste water common container and then to turn on/off said filtering unit.

3. The installation-free water purifying device as claimed in claim 1, further comprising an overflow pipe that is disposed near a top of the purified water container; said overflow pipe communicating between said purified water container and said storage space; thereby when the water level exceeds an entrance of said overflow pipe, water flows down to said storage space via the overflow pipe.

* * * * *